United States Patent
Sato et al.

(10) Patent No.: US 7,284,795 B2
(45) Date of Patent: Oct. 23, 2007

(54) AUTOMOBILE SEAT

(75) Inventors: Nobuya Sato, Ayase (JP); Makoto Sawazaki, Ayase (JP)

(73) Assignee: Johnson Controls Automotive Systems Corporation, Kanagawa (JP)

( * ) Notice: Subject to any disclaimer, the term of this patent is extended or adjusted under 35 U.S.C. 154(b) by 0 days.

(21) Appl. No.: 10/529,274

(22) PCT Filed: Jul. 25, 2003

(86) PCT No.: PCT/JP03/09452

§ 371 (c)(1),
(2), (4) Date: Sep. 23, 2005

(87) PCT Pub. No.: WO2004/028856

PCT Pub. Date: Apr. 8, 2004

(65) Prior Publication Data

US 2006/0097561 A1    May 11, 2006

(30) Foreign Application Priority Data

Sep. 27, 2002  (JP) .............................. 2002-284312

(51) Int. Cl.
*A61G 15/00*  (2006.01)

(52) U.S. Cl. ........................ 297/220; 297/391; 297/408

(58) Field of Classification Search ................ 297/408, 297/391, 220
See application file for complete search history.

(56) References Cited

U.S. PATENT DOCUMENTS

| 5,660,441 | A  | * | 8/1997  | Nagayasu et al. ...... 297/408 X |
| 5,683,141 | A  | * | 11/1997 | Wakamatsu et al. ........ 297/408 |
| 5,700,057 | A  | * | 12/1997 | De Filippo ............. 297/408 X |
| 6,183,045 | B1 | * | 2/2001  | Marfilius et al. ........... 297/391 |
| 6,527,344 | B2 | * | 3/2003  | Takei ........................ 297/391 |

FOREIGN PATENT DOCUMENTS

| JP | 01-84233  | 6/1989  |
| JP | 06-86608  | 12/1994 |
| JP | 07-39607  | 7/1995  |
| JP | 11-011199 | 1/1999  |

* cited by examiner

*Primary Examiner*—Anthony D. Barfield
(74) *Attorney, Agent, or Firm*—Foley & Lardner LLP

(57) ABSTRACT

An automobile seat having a seat cushion, a seatback, and a headrest is disclosed. The headrest includes a stay and a headrest main body. The stay is generally U-shaped and is detachably coupled to the seatback. The stay includes a generally horizontal portion having an axis. The headrest main body is rotatably coupled to the horizontal portion of the stay and includes a receiving port for receiving the horizontal portion of the stay. The headrest main body rotates around the axis of the horizontal portion of the stay. The receiving port is located at a position that is coaxial with the axis of the horizontal portion of the stay.

18 Claims, 5 Drawing Sheets

AUTOMOBILE SEAT

CROSS REFERENCE TO RELATED APPLICATIONS

This application is the National Stage of International Application No. PCT/JP2003/009452, filed Jul. 25, 2003, which claims priority to Japanese Application No. 2002-284312, filed Sep. 27, 2002, each of which are incorporated herein by reference in their entirety.

BACKGROUND

The present invention relates to an automobile seat. More specifically, the present invention relates to a structure of a headrest with which the automobile seat is provided.

For example, a conventional automobile seat is shown in FIGS. 1 to 4. FIG. 1 is a perspective view of a conventional headrest. As shown in FIG. 1, in a headrest 100 in an original state, an X-axis, a Y-axis and a Z-axis are defined in a direction from a rear surface toward a front surface of the headrest 100, a direction from a lower surface toward an upper surface of the headrest 100, and a direction from a left side surface toward a right side surface of the headrest 100, respectively. The X-axis, the Y-axis and the Z-axis are perpendicular to one another. A seat cushion and a seat back holding the seat cushion are not shown because these members are well known.

The headrest 100 comprises a stay 101 and a headrest main body 102. The stay 101 is made of a metal pipe bent into an inverted U-shape. The stay 101 is detachably engaged to the seat back by inserting stay main bodies 103a, 103b (vertical shafts) of the stay 101 into a pair of holders (not shown) which are fixedly installed to a top portion of the seat back (see Japanese Utility Model Publication No. H7-39607). The headrest main body 102 comprises a bracket 106, a pad 108 and a skin 109. The bracket 106 is rotatably attached to a connection section 104 (a horizontal shaft) of the stay 101 because a pair of bearings 107a, 107b installed on one side face of the bracket 106 hold the connection section 104. The pad 108 is made of a urethane foam material and covers the connection section 104, bend sections 105a, 105b of the stay 101 and the bracket 106. The skin 109 is made of a cloth etc. and covers the pad 108 so as to form the headrest main body 102. On the basis of the above structure, the headrest 100 is rotatably fixed to the seat back.

FIG. 2 is a cross-sectional view of the conventional headrest sectioned along a Y-Z plane in FIG. 1. Recesses 110a, 110b are formed on a lower surface of the headrest main body 102 facing the seat back to introduce the stay 101 into an interior of the headrest main body 102. The connection section 104 and the bend sections 105a, 105b of the stay 101 are received in the interior of the headrest main body 102 through the recesses 110a, 110b. Two receiving ports are installed to receive the stay 101 in the interior of the headrest main body 102 from the recesses 110a, 110b. Patches 111a, 111b are installed on the receiving ports so as to prevent a urethane fluid or a semisolid pad existing in the interior of the headrest main body 102 from leaking to an outside of the headrest main body 102 at the time of forming the pad 108. Here, the patches 111a, 111b are fixed to the stay main bodies 103a, 103b at the receiving ports.

FIGS. 3A and 3B are each a cross-sectional view of the conventional headrest sectioned along a SE1-SE1 line in FIG. 2. FIG. 4 is a perspective view of the conventional headrest in which a region C of the head rest shown in FIG. 1 is enlarged. The stay main bodies 103a, 103b of the stay 101 are detachably engaged to the pair of holders that are fixedly installed to the top portion of the seat back. The headrest main body 102 is rotatably attached to the connection section 104 of the stay 101 via the bearings 107a, 107b of the bracket 106. Therefore, the headrest main body 102 may rotate around the connection section 104 in the direction of an arrow shown in FIG. 1.

As shown in FIG. 3A, in a case where the headrest main body 102 is rotated backward by foam pressure of the urethane fluid at the time of forming the pad 108, a gap is generated between the patch 111a and the recess 110a at a left side relative to a center axis M1 of the recess 110a because the patch 111a is fixed to the stay main body 103a. Therefore, the urethane fluid or the semisolid pad may leak to the outside of the headrest main body 102 from the gap. Also, as shown in FIG. 3B, in a case where the headrest main body 102 is rotated frontward by foam pressure of the urethane fluid at the time of forming the pad 108, a gap is generated between the patch 111a and the recess 110a at a right side relative to the center axis M1 of the recess 110a because the patch 111a is fixed to the stay main body 103a. Therefore, the urethane fluid or the semisolid pad may leak to the outside of the headrest main body 102 from the gap. It should be noted that this applies not only to the recess 110a but also to the recess 110b.

If the urethane fluid or the semisolid pad leaks out, an appearance of the headrest main body 102 becomes ugly because the pad 108 is also generated at the outside of the headrest main body 102, and it takes a lot of effort because it is necessary to remove the pad 108 generated at the outside of the headrest main body 102 by hand. Further, the headrest main body 102 does not smoothly rotate because the gaps between the patch 111a and the recess 110a and between the patch 111b and the recess 110b are filled with the pad 108.

As shown in FIG. 2, in order to dispose the patch 111a between the receiving port of the recess 110a and connection section 104 of the stay 101, it is necessary to increase a length H along the Y-axis of the bend section 105a to some extent. It should be noted that this applies not only to the length H along the Y-axis of the bend section 105a but also to that of the bend section 105b. However, if the length H of the bend sections 105a, 105b increases, an open length L1 of the recesses 110a, 110b must increase so as to secure a predetermined rotational range of the headrest 100 relative to the seat back. Thus, if the open length L1 of the recesses 110a, 110b increases, an area of the receiving port which is not covered by the skin 109 increases with the increment of the open length L1. Thereby, if the headrest main body 102 is rotated frontward or backward by foam pressure of the urethane fluid at the time of forming the pad 108, the urethane fluid or the semisolid pad may widely leak to the outside of the headrest main body 102.

Further, if the length H of the bend sections 105a, 105b has a certain large value, flexibility of a form of the headrest main body 102 is reduced.

The present automobile seat is proposed in view of the above actual conditions. An object of the present automobile seat is to provide an automobile seat comprising a headrest which has high forming-flexibility by lessening the possibility that a urethane fluid or a semisolid pad could leak out of a receiving port for receiving a stay into an interior of the headrest at the time of forming a pad of the headrest and by reducing a gap to be generated between a lower surface of the headrest and a top portion of the stay.

DETAILED DESCRIPTION OF THE EXEMPLARY AND ALTERNATIVE EMBODIMENTS

Figure 1:
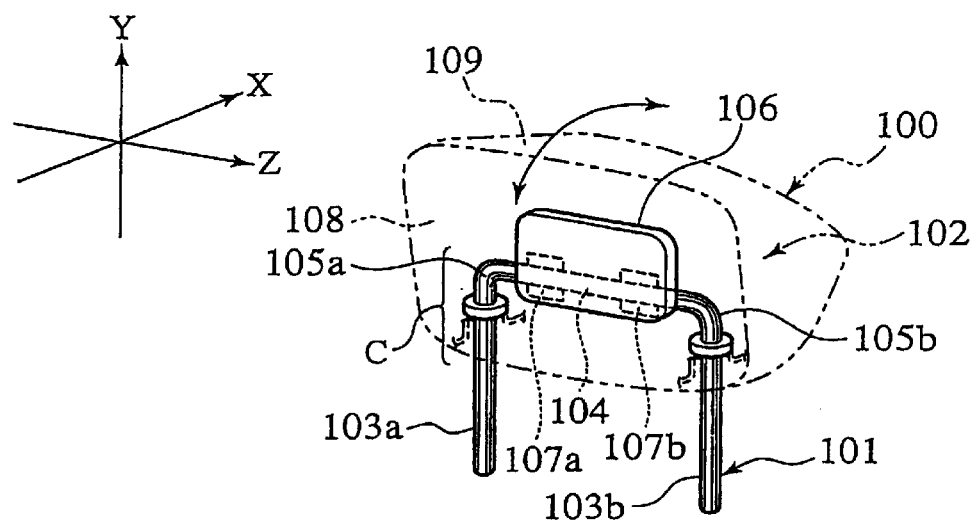
FIG. 1 is a perspective view of a conventional headrest.
Figure 2:
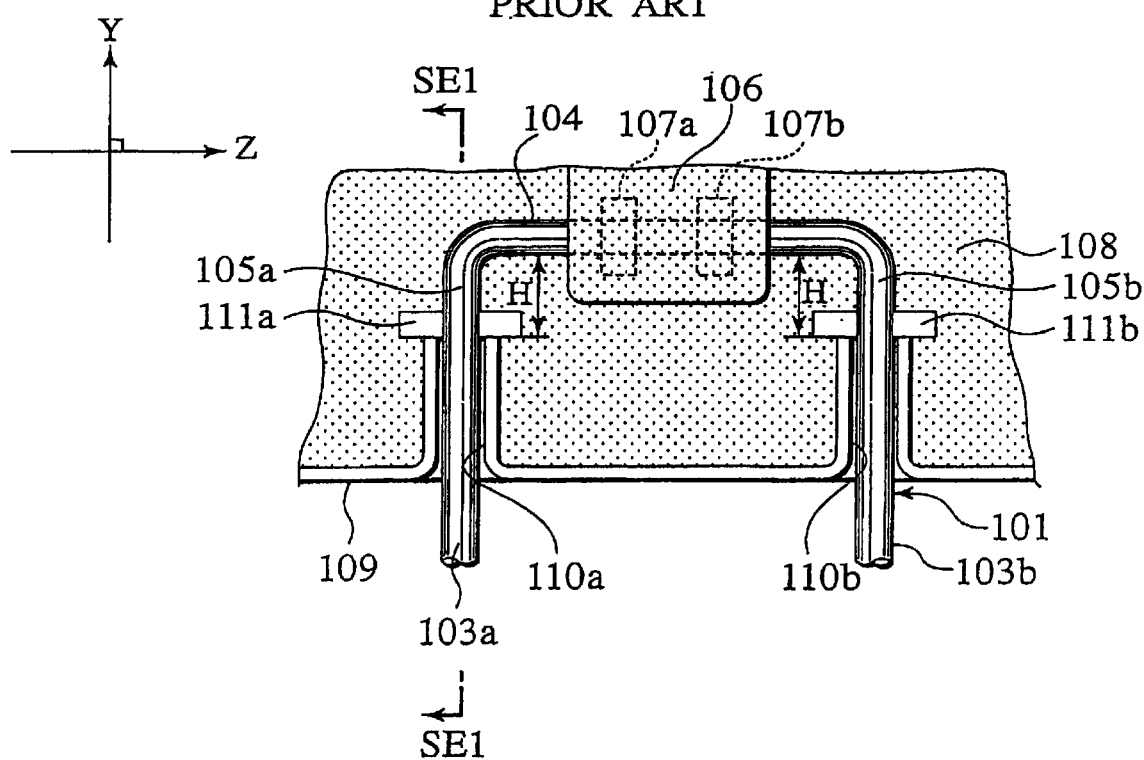
FIG. 2 is a cross-sectional view of the conventional headrest.
Figure 3A:
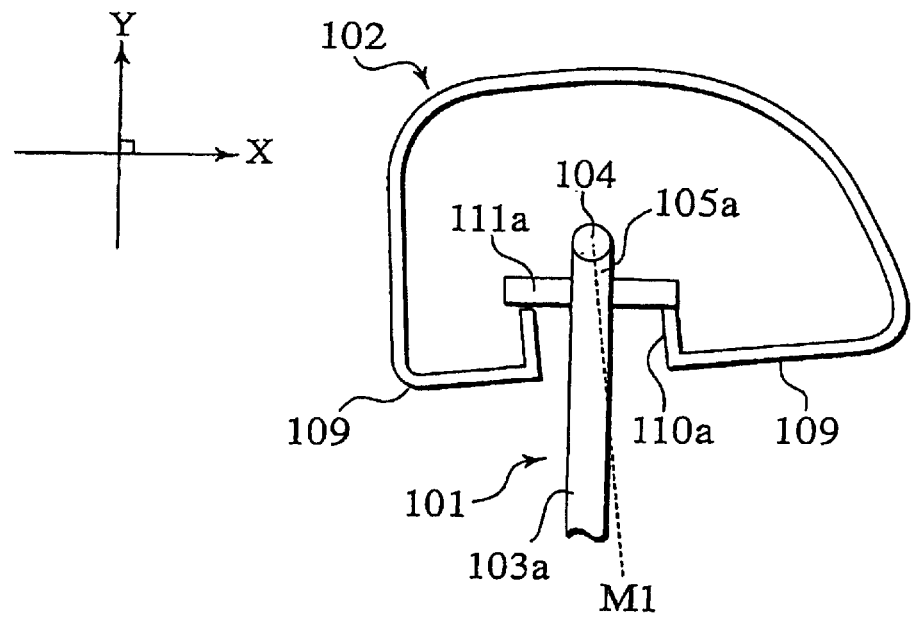
FIGS. 3A and 3B are cross-sectional views taken along line SE1-SE1 in FIG. 2 illustrating an action of the conventional headrest.
Figure 3B:
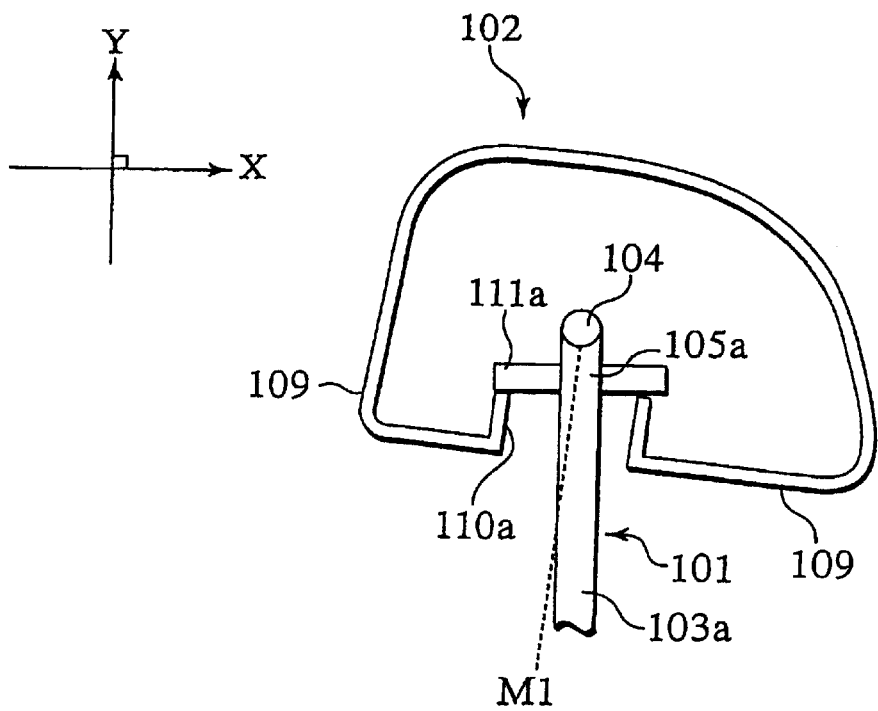
Figure 4:
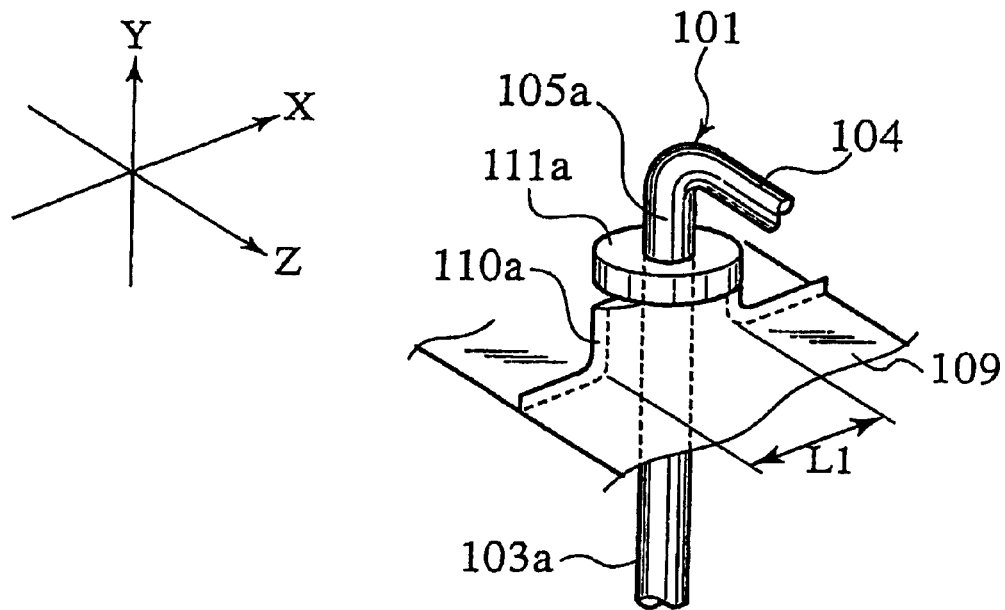
FIG. 4 is a perspective view of a region C in FIG. 1 shown enlarged.

The present automobile seat provides an automobile seat comprising a headrest having a stay made of a pipe bent into an inverted U-shape and detachably engaged to a top portion of a seat back and a headrest main body rotatably coupled to a horizontal shaft of the stay, wherein a receiving port for introducing the horizontal shaft of the stay into an interior of the headrest main body is formed into the headrest main body so as to be located at a coaxial position with the horizontal shaft of the stay which is a rotational axis of the headrest main body.

According to this embodiment, since the receiving port for receiving the horizontal shaft of the stay is formed into the headrest main body so as to be located at a coaxial position with the horizontal shaft of the stay which is the rotational axis of the headrest main body, a urethane fluid or a semisolid pad is substantially prevented from leaking out even if the headrest main body is rotated by foaming pressure of the urethane fluid at the time of forming the pad.

In one exemplary embodiment, the headrest main body has a bracket for rotatably coupling the headrest main body to the horizontal shaft of the stay, a foaming material covering the horizontal shaft of the stay and the bracket, and a skin covering the foaming material, wherein the receiving port is formed on a side surface of a recess which is formed on the skin and receives a bend section of the stay.

According to this embodiment, since the receiving port is formed on the side surface of the recess which is formed on the skin and receives the bend section of the stay, it is not necessary to install patch on the receiving port and therefore, a distance between a bottom surface of the headrest main body and a connection section of the stay becomes small and flexibility of a form of the headrest main body is not reduced.

In another exemplary embodiment, a diameter of the receiving port is about half of a diameter of the horizontal shaft of the stay.

According to this embodiment, since the diameter of the receiving port is about half of the diameter of the connection section of the stay, the connection section of the stay is in close contact with the receiving port and therefore, the urethane fluid or the semisolid pad is substantially prevented from leaking out at the time of forming the pad.

In another exemplary embodiment, the side surface of the recess is made of an extensible material.

According to this embodiment, since the side surface of the recess is made of the extensible material, the connection section of the stay is in close contact with the receiving port and therefore, the urethane fluid or the semisolid pad is substantially prevented from leaking out at the time of forming the pad. It is further easy to engage the stay to the skin.

In another exemplary embodiment, an open length of the recess along an anteroposterior direction of the headrest main body is larger than a diameter of a vertical shaft of the stay.

According to this embodiment, since the open length of the recess along the anteroposterior direction of the headrest main body is larger than the diameter of the vertical shaft of the stay, the headrest main body smoothly rotates frontward or backward around the horizontal shaft of the stay.

Hereinafter, an embodiment of the present invention will be described with reference to drawings.

Figure 5:
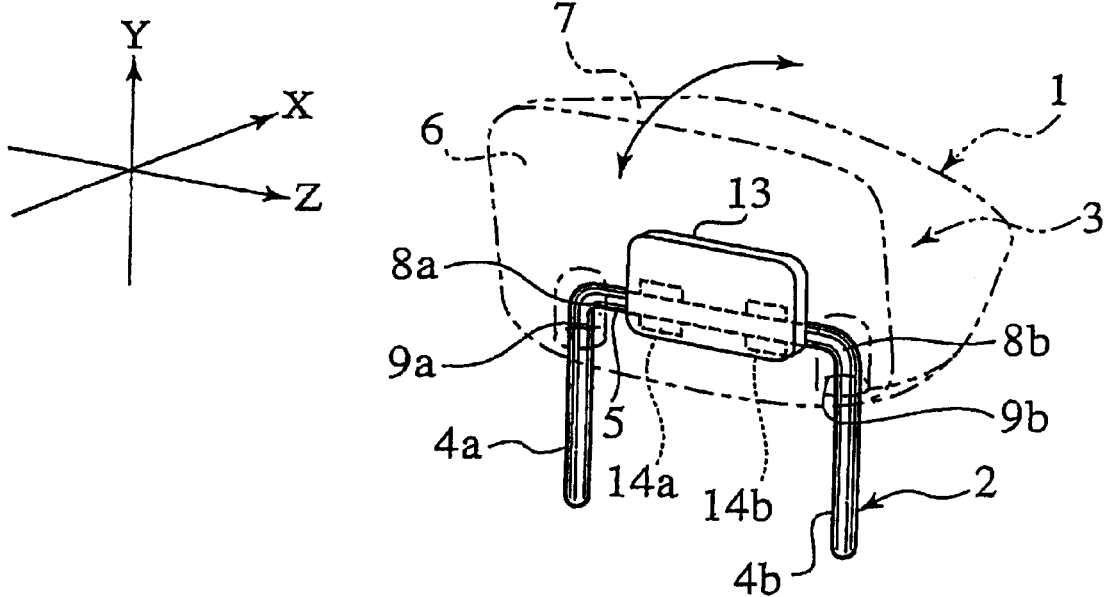
FIG. 5 is a perspective view of a headrest according to one exemplary embodiment.

FIG. 5 is a perspective view of a headrest according to the present embodiment. In a headrest 1 in an original state shown in FIG. 5, an X-axis, a Y-axis and a Z-axis are defined in a direction from a rear surface toward a front surface of the headrest 1, a direction from a lower surface toward an upper surface of the headrest 1, and a direction from a left side surface toward a right side surface of the headrest 1, respectively. The X-axis, the Y-axis and the Z-axis are perpendicular to one another. A seat cushion and a seat back holding the seat cushion are not shown because these members are well known.

The headrest 1 comprises a stay 2 and a headrest main body 3. The stay 2 is made of a metal pipe bent into an inverted U-shape. The stay 2 is detachably coupled to the seat back by inserting stay main bodies 4a, 4b (vertical shafts) of the stay 2 into a pair of holders which are fixedly installed to a top portion of the seat back. The headrest main body 3 comprises a bracket 13, a pad 6 and a skin 7. The bracket 13 is rotatably coupled to a connection section 5 (a horizontal shaft) of the stay 2 because bearings 14a, 14b installed on the bracket 13 hold the connection section 5. The pad 6 is made of a foaming material such as a urethane foam and covers the connection section 5 of the stay 2 and the bracket 13. The skin 7 is made of an extensible cloth and covers the pad 6 so as to form the headrest main body 3. On the basis of the above structure, the headrest 1 is rotatably fixed to the seat back.

Figure 6:
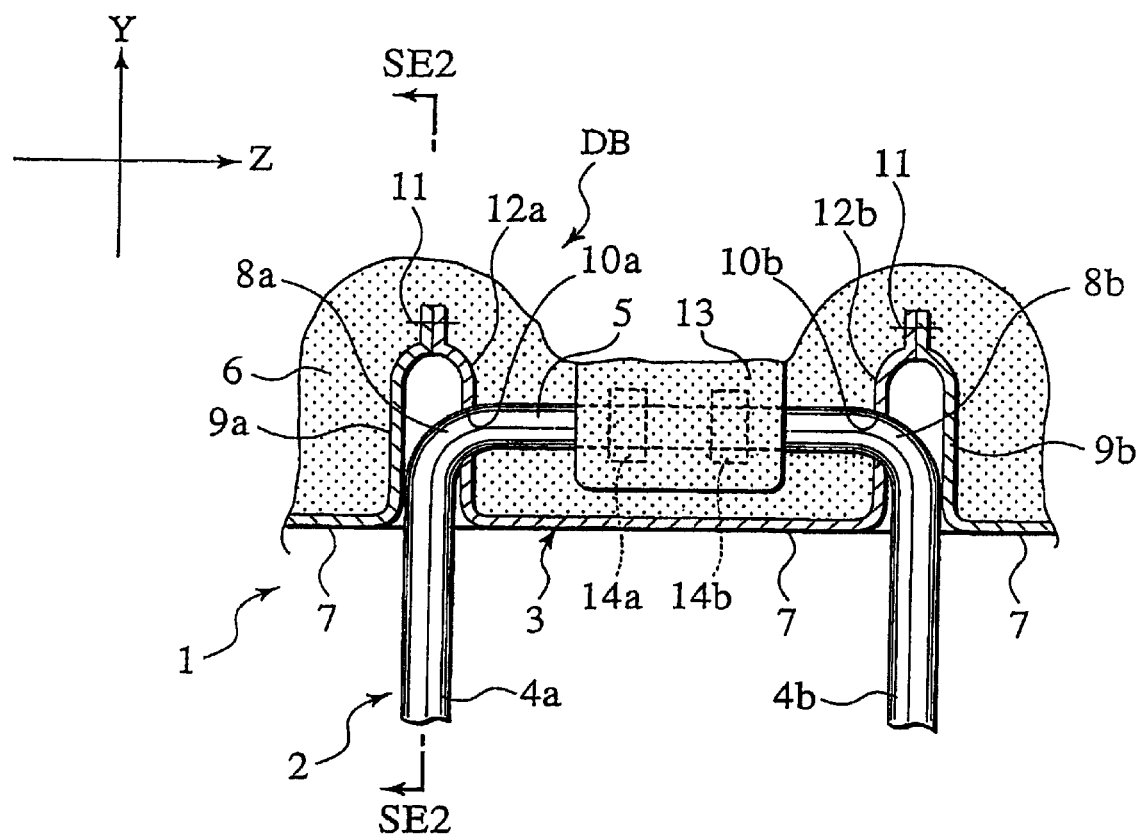
FIG. 6 is an cross-sectional view of one portion of the headrest of FIG. 5.

FIG. 6 is a cross-sectional view of the headrest according to the present embodiment sectioned along a Y-Z plane in FIG. 5. Recesses 9a, 9b are formed on a lower surface of the headrest main body 3 facing the seat back to introduce the stay 2 into an interior of the headrest main body 3. The connection section 5 and bend sections 8a, 8b of the stay 2 are respectively received in the interior of the headrest main body 3 and in interiors of the recesses 9a, 9b through the recesses 9a, 9b. Receiving ports 10a, 10b for receiving the stay 2 from the recesses 9a, 9b into the interior of the headrest main body 3 are respectively formed on side faces 12a, 12b of the recesses 9a, 9b which face each other.

Figure 7:
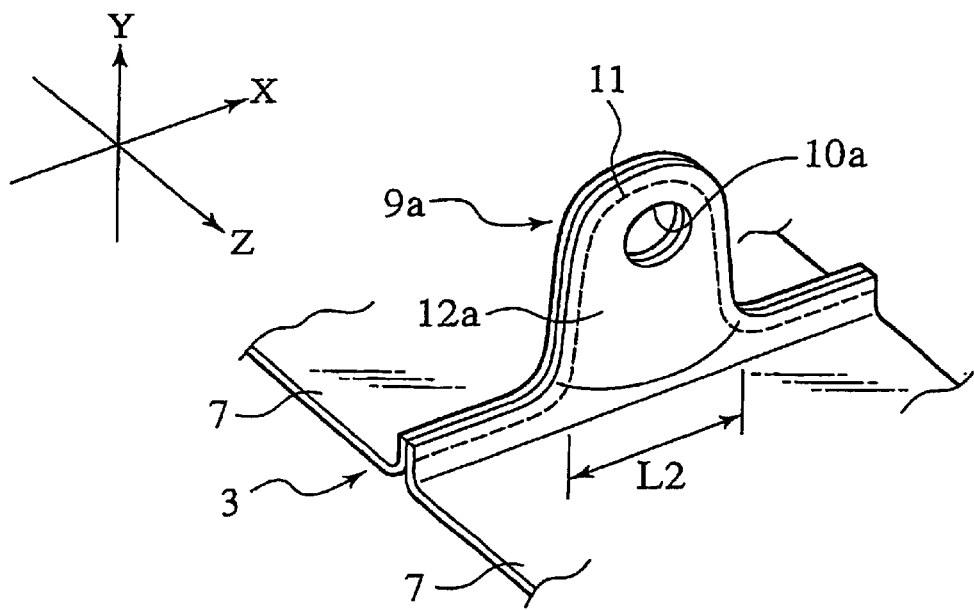
FIG. 7 is a perspective view of a portion of the headrest of FIG. 6 as viewed from an arrow DB in FIG. 6.

FIG. 7 is a perspective view of the recess 9a and the receiving port 10a from an arrow DB in FIG. 6. In the present embodiment, each diameter of the receiving ports 10a, 10b is about half of a diameter of connection section 5 of the stay 2. An open length L2 of the recesses 9a, 9b in the direction from the rear surface toward the front surface of the headrest, that is to say, along the X-axis, is slightly larger than a diameter of the stay main body 4 of the stay 2 so that the headrest main body 3 can smoothly rotate around the connection section 5 of the stay 2 within a predetermined rotational range. The skin 7 forms side faces of the recesses 9a, 9b and is sutured by engaging threads 11a, 11b on top portions of the recesses 9a, 9b.

Figure 8A:
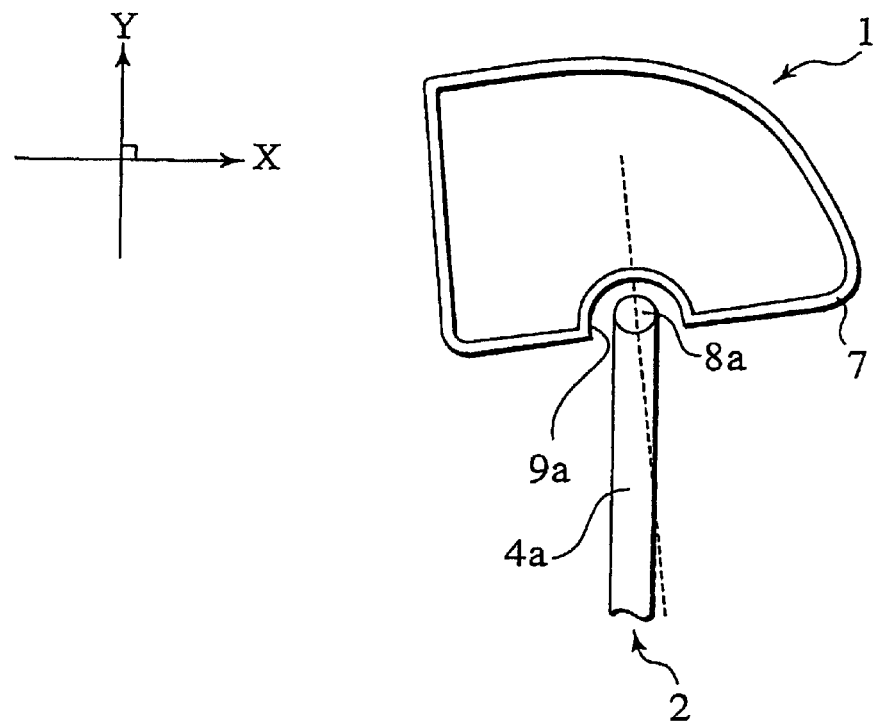
FIGS. 8A and 8B are cross-sectional views taken along line SE2-SE2 in FIG. 6 illustrating an action of the headrest.
Figure 8B:
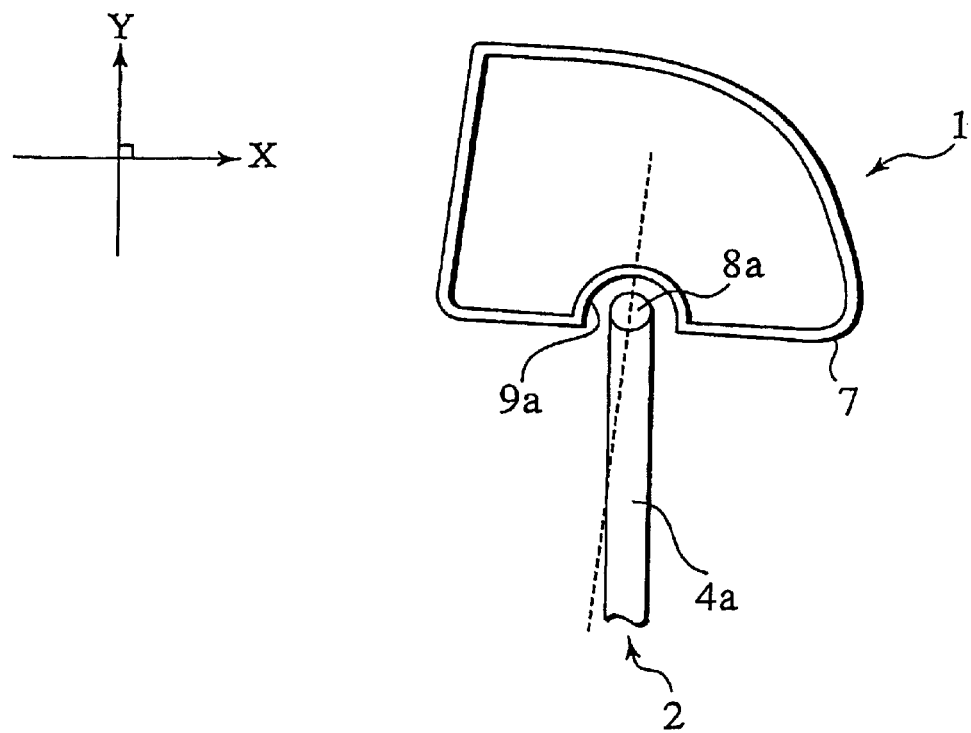

FIGS. 8A and 8B are each cross-sectional views of the headrest taken along a SE2-SE2 line in FIG. 6. The stay main bodies 4a, 4b of the stay 2 are detachably coupled to the pair of holders that are fixedly installed to the top portion of the seat back. The headrest main body 3 is rotatably coupled to the connection section 5 of the stay 2 via the bearings 14a, 14b of the bracket 13. Therefore, the headrest main body 3 may rotate around the connection section 5 in the direction of an arrow shown in FIG. 5.

As shown in FIG. 8A, in a case where the headrest main body 3 is rotated backward by foam pressure of a urethane fluid at the time of forming the pad 6, the receiving port 10a is always in close contact with the connection section 5 of the stay 2 because the receiving port 10a is formed at a coaxial position with the connection section 5, which is a rotational axis of the headrest main body 3. Therefore, the urethane fluid or a semisolid pad may not substantially leak to the outside of the headrest main body 3. Also, as shown in FIG. 8B, in a case where the headrest main body 3 is rotated frontward by foam pressure of the urethane fluid at the time of forming the pad 6, the receiving port 10a is always in close contact with the connection section 5 of the stay 2 because the receiving port 10a is formed at the coaxial position with the connection section 5, which is a rotational axis of the headrest main body 3. Therefore, the urethane fluid or the semisolid pad may not substantially leak to the outside of the headrest main body 3. It should be noted that this applies not only to the receiving port 10a but also to the receiving port 10b.

In the headrest 1 structured in this manner, it is not necessary to install patches on the receiving ports as with the conventional headrest because the receiving ports 10a, 10b are only formed on the side faces 12a, 12b of the recesses 9a, 9b. Further, if the headrest main body 3 is rotated frontward or backward by foaming pressure of the urethane fluid at the time of forming the pad 6, the urethane fluid or the semisolid pad is substantially prevented from leaking out because the receiving ports 10a, 10b are in close contact with the connection section 5 of the stay 2.

Also, it is easy to engage the stay 2 to the skin 7 because the skin 7 forming the recesses 9a, 9b is made of the extensible cloth. Further, distances between the receiving port 10a and the connection section 5 and between the receiving port 10b and the connection section 5 become small and flexibility of a form of the headrest main body 3 is not reduced, because it is not necessary to install patches as with the conventional headrest.

Also, if the headrest main body 3 rotates frontward or backward, a close-contact state of the stay 2 and the receiving ports 10a, 10b does not loosen because the receiving ports 10a, 10b are formed at the coaxial position with the connection section 5, which is the rotational axis of the headrest main body 3.

As described above, if the headrest main body is rotated by a foamed urethane fluid at the time of forming the pad, the urethane fluid or the semisolid pad is substantially prevented from leaking out because the receiving ports for receiving the connection section of the stay are formed on the side faces of the recesses formed on the bottom surface of the headrest main body such that the receiving ports have a coaxial position with the connection section, which is the rotational axis of the headrest main body. Further, a distance between the bottom surface of the headrest main body and the connection section of the stay becomes small and flexibility of a form of the headrest main body is not reduced because it is not necessary to install patches as with the conventional headrest.

Also, the connection section of the stay is always in close contact with the receiving ports, because each diameter of the receiving ports is about half of a diameter of the connection section of the stay and the side faces of the recesses are made of the extensible cloth. Therefore, the urethane fluid or the semisolid pad is substantially prevented from leaking out.

The invention claimed is:

1. An automobile seat having a seat cushion and a seatback, the automobile seat comprising:
   a headrest including:
      a generally U-shaped stay detachably coupled to the seatback, the stay including a generally horizontal portion having an axis; and
      a headrest main body rotatably coupled to the horizontal portion of the stay and including:
         a bracket for rotatably coupling the headrest main body to the horizontal portion of the stay;
         a foaming material enclosing the horizontal portion of the stay and the bracket; and
         a skin at least partially covering the foaming material and defining a receiving port for receiving the horizontal portion of the stay therein;
      wherein the headrest main body rotates around the axis of the horizontal portion of the stay and wherein the receiving port is located at a position that is coaxial with the axis of the horizontal portion of the stay;
      wherein the foaming material includes a side surface having a recess and wherein the receiving port communicates with the side surface; and
      wherein the skin abuts the horizontal portion of the stay and the foaming material at the receiving port.

2. The automobile seat of claim 1, wherein the stay includes a bent portion receivable within the recess.

3. The automobile seat of claim 1, wherein an inner diameter of the receiving port is half of a diameter of the horizontal portion of the stay.

4. The automobile seat of claim 1, wherein an inner diameter of the receiving port is smaller than a diameter of the horizontal portion of the stay.

5. The automobile seat of claim 4, wherein at least a portion of the side surface of the recess is made of an extensible material.

6. The automobile seat of claim 1, wherein the stay includes a vertical portion detachably coupled to the seatback.

7. The automobile seat of claim 6, wherein the recess includes an open length along an anteroposterior direction of the headrest main body and wherein the open length is larger than a diameter of the vertical portion of the stay.

8. A headrest for use with an automobile seat having a seat cushion and a seatback, the headrest comprising:
   a generally U-shaped stay configured to be detachably coupled to the seatback, the stay including a generally horizontal portion having an axis; and
   a headrest main body rotatably coupled to the horizontal portion of the stay and including:
      a bracket for rotatably coupling the headrest main body to the horizontal portion of the stay;
      a foaming material enclosing the horizontal portion of the stay and the bracket; and
      a skin at least partially covering the foaming material and defining a receiving port for receiving the horizontal portion of the stay therein;

wherein the headrest main body rotates around the axis of the horizontal portion of the stay and wherein the receiving port is located at a position that is coaxial with the axis of the horizontal portion of the stay;

wherein the foaming material including a side surface having a recess and wherein the receiving port communicates with the side surface; and wherein the skin abuts the horizontal portion of the stay and the foaming material at the receiving port.

9. The headrest of claim 8, wherein the stay includes a bent portion received within the recess.

10. The headrest of claim 8, wherein an inner diameter of the receiving port is about half of a diameter of the horizontal portion of the stay.

11. The headrest of claim 8, wherein an inner diameter of the receiving port is smaller than a diameter of the horizontal portion of the stay.

12. The headrest of claim 11, wherein at least a portion of the side surface of the recess is made of an extensible material.

13. The headrest of claim 8, wherein the stay includes a vertical portion configured to be detachably coupled to the seatback.

14. The headrest of claim 13, wherein the recess includes an open length along an anteroposterior direction of the headrest main body and wherein the open length is larger than a diameter of the vertical portion of the stay.

15. A headrest for an automobile seat having a seatback, the headrest comprising:

a generally U-shaped stay configured to couple to the seatback, the stay comprising a generally horizontal portion having an axis;

a headrest main body rotatably coupled to the horizontal portion of the stay;

a foaming material at least partially enclosing the horizontal portion of the stay; and a skin at least partially covering the foaming material and defining at least two receiving ports for receiving the horizontal portion of the stay therein, the skin abutting the substantially horizontal portion and the foaming material at the at least two receiving ports, wherein the at least two receiving ports are located at positions that are coaxial with the axis of the horizontal portion of the stay.

16. The headrest of claim 15, further comprising:

a bracket for rotatably coupling the headrest main body to the horizontal portion of the stay.

17. The headrest of claim 15, wherein each of the at least two receiving ports is cylindrically shaped.

18. The headrest of claim 15, further comprising:

a side surface defining a recess and wherein at least one of the at least two receiving ports is coupled to the side surface.

* * * * *